(12) United States Patent
Shiozawa

(10) Patent No.: US 6,757,050 B1
(45) Date of Patent: *Jun. 29, 2004

(54) EXPOSURE METHOD AND APPARATUS FOR DETECTING AN EXPOSURE AMOUNT AND FOR CALCULATING A CORRECTION VALUE BASED ON THE DETECTED EXPOSURE AMOUNT

(75) Inventor: Takahisa Shiozawa, Utsunomiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/013,201

(22) Filed: Jan. 26, 1998

Related U.S. Application Data

(63) Continuation of application No. 08/417,903, filed on Apr. 6, 1995, now abandoned, which is a continuation-in-part of application No. 08/364,078, filed on Dec. 23, 1994, now abandoned, which is a continuation of application No. 08/172,055, filed on Dec. 23, 1993, now abandoned.

(30) Foreign Application Priority Data

Dec. 28, 1992 (JP) ............................................. 4-360793

(51) Int. Cl.⁷ .......................... G03B 27/54; G03B 27/72
(52) U.S. Cl. ..................................................... 355/67
(58) Field of Search ...................... 355/67, 71; 356/121

(56) References Cited

U.S. PATENT DOCUMENTS

| | | | |
|---|---|---|---|
| 4,506,977 A | | 3/1985 | Sato et al. ..................... 355/53 |
| 4,666,273 A | | 5/1987 | Shimizu et al. .............. 353/101 |
| 4,799,791 A | * | 1/1989 | Echizen et al. .............. 356/121 |
| 4,920,505 A | * | 4/1990 | Suzuki ........................ 364/525 |
| 4,947,047 A | | 8/1990 | Muraki ..................... 250/492.2 |
| 4,974,919 A | | 12/1990 | Muraki et al. ................ 350/6.6 |
| 4,998,212 A | * | 3/1991 | Ohta et al. ................... 353/122 |
| 5,097,291 A | | 3/1992 | Suzuki ......................... 355/69 |
| 5,121,160 A | | 6/1992 | Sano et al. .................... 355/53 |
| 5,137,349 A | * | 8/1992 | Taniguchi et al. ........... 353/122 |
| 5,247,329 A | * | 9/1993 | Oshida et al. ................. 355/53 |
| 5,305,054 A | | 4/1994 | Suzuki et al. ................. 355/53 |
| 5,309,198 A | * | 5/1994 | Nakagawa ..................... 355/67 |
| 5,424,552 A | * | 6/1995 | Tsuji et al. .................... 355/53 |
| 5,436,692 A | * | 7/1995 | Noguchi ....................... 355/53 |
| 5,499,076 A | * | 3/1996 | Muraki ......................... 355/53 |

FOREIGN PATENT DOCUMENTS

| | | |
|---|---|---|
| JP | 60-188950 | 9/1985 |
| JP | 62-187815 | 8/1987 |
| JP | 63-193130 | 8/1988 |
| JP | 3-123015 | 5/1991 |
| JP | 4-048714 | 2/1992 |
| JP | 4-252013 | 9/1992 |
| JP | 5-343288 | 12/1993 |

\* cited by examiner

*Primary Examiner*—Christopher E. Mahoney
(74) *Attorney, Agent, or Firm*—Fitzpatrick, Cella, Harper & Scinto

(57) ABSTRACT

An exposure method and apparatus wherein exposures are made repeatedly and wherein an amount of exposure is controlled on the basis of detection of an integrated light quantity of a portion of exposure light used for an exposure. In response to completion of each exposure or exposures of a determined number, a ratio between intensity of the exposure light upon a substrate being exposed and the portion of the exposure light is detected, which ratio is used for the exposure amount control.

18 Claims, 3 Drawing Sheets

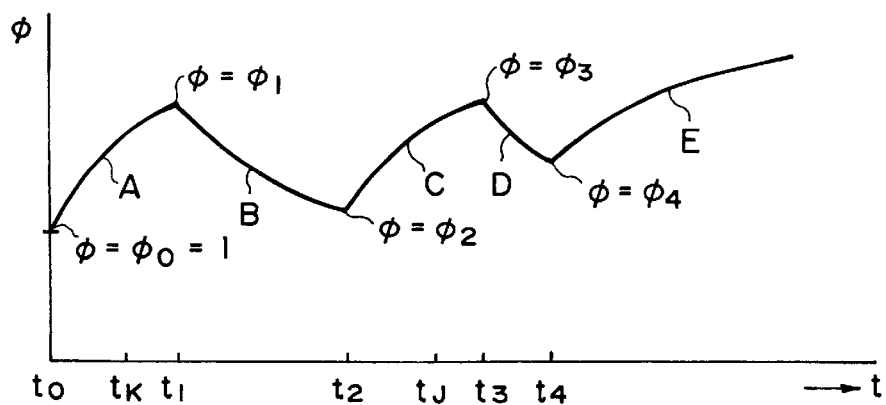
F I G. 2
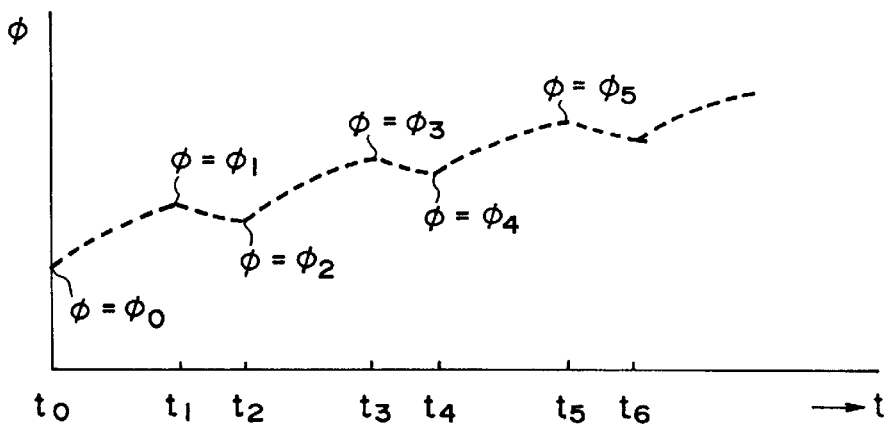
F I G. 3
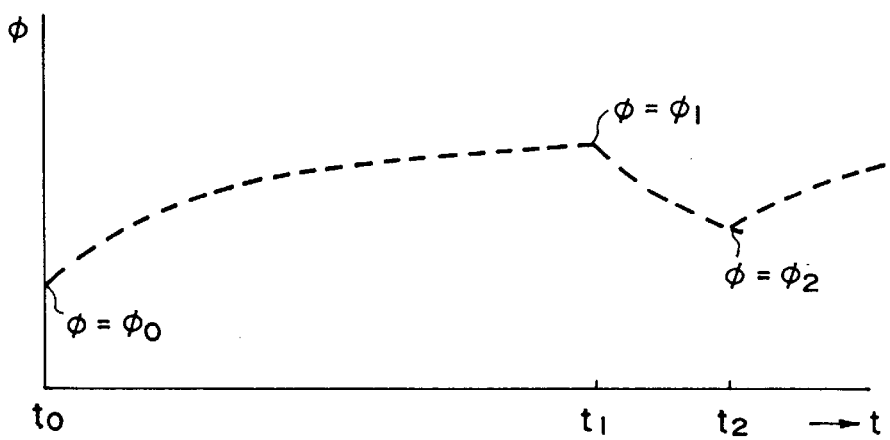
F I G. 4

EXPOSURE METHOD AND APPARATUS FOR DETECTING AN EXPOSURE AMOUNT AND FOR CALCULATING A CORRECTION VALUE BASED ON THE DETECTED EXPOSURE AMOUNT

This application is a continuation of Applicant's prior application Ser. No. 08/417,903, filed Apr. 6, 1995 abandoned, which is a continuation-in-part of application Ser. No. 08/364,078, filed Dec. 23, 1994 (abandoned), which is a continuation of application Ser. No. 08/172,055, filed Dec. 23, 1993 (abandoned).

FIELD OF THE INVENTION AND RELATED ART

This invention relates to an exposure method and apparatus suitably usable, for example, for the manufacture of semiconductor devices such as ICs or LSIs. In another aspect, the invention is concerned with a device manufacturing method for manufacturing microdevices by using such an exposure method or apparatus.

An exposure apparatus is used to expose a wafer having a resist applied thereto to a pattern of a semiconductor chip (e.g., an IC or on LSI) with exposure light. In this exposure process, a portion of the exposure light is detected by using a light dividing element which is disposed along the path of the exposure light from a light source and which is placed between the light source and the semiconductor chip pattern. On the basis of the light detection, the integrated quantity of the partial light is measured and a amount of exposure is control. Such exposure controlled is done on an assumption that the ratio of the intensity of the partial light to the intensity of the exposure light impinging on the wafer is constant.

However, the applicant has found that, during repetition of the exposure process using the exposure apparatus, the light absorptivity of a condenser lens which may be disposed between the light dividing element and the semiconductor chip pattern and/or the light absorptivity of a projection optical system for projecting the chip pattern onto the wafer may change, and that, as a result, the ratio of the intensity of the partial light mentioned above to the intensity of the exposure light impinging on the wafer may change. If it changes, then correct exposure control is not attainable.

SUMMARY OF THE INVENTION

It is accordingly an object of the present invention to provide an improved exposure method and/or apparatus by which the amount of exposure can be controlled precisely.

It is another object of the present invention to provide an improved device manufacturing method based on such an exposure method or apparatus.

In accordance with an aspect of the present invention, there is provided an exposure method wherein exposures are made repeatedly, said method comprising the steps of: controlling an amount of exposure on the basis of detection of an integrated light quantity of a portion of exposure light used for an exposure; and detecting, in response to completion of each exposure or exposures of a determined number, a ratio in intensity between the exposure light upon a substrate being exposed and the portion of the exposure light, which ratio is used for the exposure amount control.

In accordance with another aspect of the present invention, there is provided an exposure apparatus, comprising: a light dividing means disposed along a path of exposure light to extract a portion of the exposure light; exposure control means for detecting an integrated light quantity of the portion of the exposure light extracted by said light dividing means, to control the amount of exposure; and ratio detecting means for detecting, in response to completion of each exposure or a predetermined number of exposures, a ratio in intensity between the extracted portion and the exposure light upon a substrate, which ratio is used for the exposure amount control.

In accordance with a further aspect of the present invention, there is provided an exposure method wherein exposures are made repeatedly, said method comprising the steps of: controlling an amount of exposure on the basis of detection of an integrated light quantity of a portion of exposure light used for an exposure; and detecting a change in ratio between the intensity of the exposure light upon a substrate being exposed and the intensity of the portion of the exposure light.

In accordance with a still further aspect of the present invention, there is provided an exposure apparatus, comprising: a light dividing means disposed along a path of exposure light to extract a portion of the exposure light; exposure control means for detecting an integrated light quantity of the portion of the exposure light extracted by said light dividing means, to control the amount of exposure; and detecting means for detecting a change in ratio between the intensity of the extracted portion and the intensity of the exposure light upon a substrate.

In one preferred form of an exposure method or apparatus of the present invention, a first photodetector is used to receive the portion of the light to produce a signal corresponding to the intensity of the received light. A second photodetector having a light receiving surface disposed substantially at the same level as the substrate is used to receive the exposure light to produce a signal corresponding to the intensity thereof. The intensity ratio is determined on the basis of these signals.

In another preferred form of an exposure method or apparatus of the present invention, the intensity ratio is determined on the basis of information which concerns changes in transmissivity, with respect to the exposure light, of an optical system for projecting the exposure light to the substrate after the portion being extracted.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 2 is a graph for explaining exposure correction made in the first embodiment.

FIG. 3 is similar to FIG. 2, but it explains another example of exposure correction.

FIG. 4 is similar to FIG. 2 or 3, but it explains a further example of exposure correction.

DESCRIPTION OF THE PREFERRED EMBODIMENTS

Figure 1:
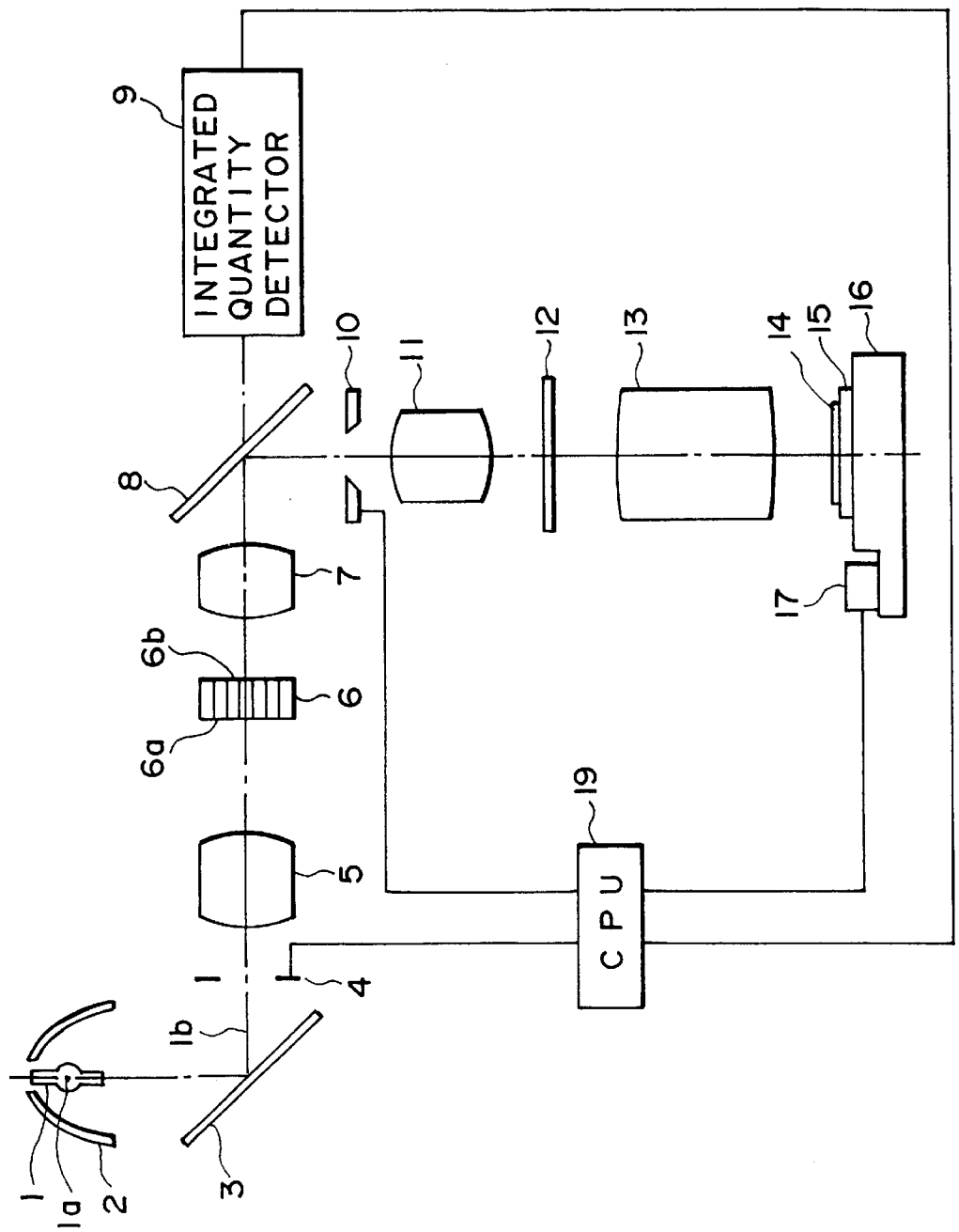
FIG. 1 is a schematic view of a first embodiment of the present invention.

FIG. 1 schematically shows a main portion of a first embodiment of the present invention.

Denoted in the drawing at 2 is an elliptical mirror, and denoted at 1 is a light emitting tube (light source) having a high-luminance light emitting portion 1a adapted to emit ultraviolet rays or deep ultraviolet rays. The light emitting portion 1a is disposed close to the first focal point of the elliptical mirror 2. Denoted at 3 is a cold mirror having a base and a multilayered film thereon, and it is adapted to transmit almost all infrared rays therethrough but reflect almost all ultraviolet rays. Through cooperation of this cold mirror, the elliptical mirror 2 serves to form an image (light source image) 1b of the light emitting portion 1a in the neighborhood of the second focal point thereof. Denoted at 4 is a shutter which is disposed adjacent to the second focal point of the elliptical mirror 2.

Denoted at 5 is an optical system for imaging the light source image 1b, formed adjacent to the second focal point, upon the entrance surface 6a of an optical integrator 6. The optical integrator 6 comprises a plurality of minute lenses 6i (i=1 to N) arrayed two-dimensionally with a predetermined pitch, and it serves to form a secondary light source in the neighborhood of the light exit surface 6b thereof.

Denoted at 7 is a light collecting lens by which the light emerging from the secondary light source, adjacent to the light exit surface 6b of the optical integrator 6, is collected. A portion of the collected light is reflected by a half mirror (light dividing element) 8. The reflected light is directed to a masking blade means 10, to illuminate the opening of the masking blade means uniformly. The masking blade means 10 comprises a plurality of movable light blocking plates, and it serves to define an opening of a desired shape.

Denoted at 9 is an integrated light quantity detector. It serves to detect the light transmitted through the half mirror 8, to indirectly detect the amount of exposure of the surface of a wafer 14. Denoted at 11 is an imaging lens for projecting an image of the opening of the masking blade means 10 upon the surface of a reticle 12 (which is the surface to be illuminated on this occasion), to thereby uniformly illuminate an appropriate region of the reticle 12.

Denoted at 13 is a projection optical system for projecting the circuit pattern of the reticle 12 upon the surface of the wafer 14, placed on a wafer chuck 15, in a reduced scale. Denoted at 16 is a wafer stage.

Denoted at 17 is an exposure amount detector having its light receiving surface disposed to be substantially coplanar (at the same level) with the wafer 14 surface. The detector 17 serves to detect all the light fluxes from the aperture of the masking blade 10, the size of which aperture may be set to be equal to e.g., 10 mm square in terms of the wafer 14 surface, such that it functions to detect the actual illuminance (i.e., exposure amount) upon the wafer 14 surface.

Denoted at 19 is a computing means having a memory means. Predetected information about changes in transmissivity, depending on the exposure hysteresis, of the optical elements disposed along the optical path between the light dividing element 8 and the wafer 14 and predetected information about changes in transmissivity of them which may result from changes in environmental conditions, are stored in this memory means. The computing means calculates an actual exposure amount of the wafer 14 surface on the basis of a signal from the integrated exposure amount detector 9 and the information about changes in transmissivity memorized in the memory means, to control the opening/closing of the shutter 4 by which the exposure amount of the wafer 14 is controlled. Also, the computing means determines the integrated exposure amount, representing the correct exposure amount of the wafer 14 surface, on the basis of the result of measurement of the quantity of illumination light as detected through the integrated light quantity detector 9 prior to the pattern transfer process and the result of measurement of the exposure amount as detected through the exposure amount detector 17.

In this embodiment, the exposure amount of the wafer 14 is set correctly in the manner described above and, also, it is controlled precisely. Thus, the pattern of the reticle 12 can be transferred to the wafer surface accurately. Through an appropriate developing process, etc., to be made thereafter, semiconductor devices are manufactured.

Now, the manner of controlling the exposure amount of the wafer 14 surface by using the computing means 19 will be explained in greater detail.

The transmissivity of each optical element disposed between the light dividing element 8 and the wafer 14 may change as a result of repetitions of exposure processes (exposure hysteresis), and such a change in transmissivity is predetected through experiments beforehand.

FIGS. 2–4 are graphs each for explaining changes in ratio of the illuminance (measured value) $I_1$ upon the integrated light quantity detector 9 to the illuminance (actual illuminance) $I_2$ upon the wafer 14 surface as detected through the exposure amount detector, during the exposure period and the non-exposure period, the ratio corresponding to the exposure correction value $\phi(=I_1/I_2)$. The axis of the abscissa in each graph denotes time t.

Conventionally, no attention has been paid to the possibility of a change of exposure correction value $\phi$, being fixed to 1. With this exposure control, therefore, the exposure amount cannot be controlled precisely. In this embodiment of the present invention, in consideration thereof, changes of exposure correction value $\phi$ with repetition of exposure processes are measured through experiments, and the results (measured data) are plotted in a graph wherein time is taken on the axis of the abscissa while the exposure correction value is taken on the axis of the ordinate. Then, function fitting is performed to this graph while using the least square method, for example, and a function equation which represents how the exposure correction value $\phi$ changes during the exposure process period as well as a function equation which represents how the exposure correction value changes during the non-exposure process period after the exposure process period are obtained.

In FIG. 2, the ratio (hereinafter "exposure correction value")$\phi$ as the exposure process is going to be executed initially is taken as $\phi=1$.

In this drawing, illustrated in sections A, C and E are changes in exposure correction value $\phi$ during the exposure period, while illustrated in sections B and D are changes in exposure correction value $\phi$ during the non-exposure period.

Now, the exposure process starts at time $t=t_0$ (section A). The exposure correction value $\phi_K$ during time period t ($=t_K$) in the section A, is expressed as follows:

$$\phi_K = f_1(t_K - t_0, e_A, e_B, \phi_0) \tag{1}$$

where $e_A$ denotes the light quantity per unit time of the light impinging on the imaging lens 11, $e_B$ denotes the light quantity per unit time of the light impinging on the projection optical system 13, and $\phi_0$ denotes the exposure correction value just before the start of the exposure operation ($\phi_0=1$, on this occasion). The light quantities $e_A$ and $e_B$ depend on the intensity $I_1$ of the light reflected by the light dividing element 8, the opening size (area) $S_m$ of the masking blade means 10 and the average transmissivity $R_r$ of the reticle 12. Therefore, equation (1) can be rewritten as follows:

$$\phi_K = f_2(t_K - t_0, I_1, S_m, R_r, \phi_0) \quad (2)$$

The opening area $S_m$ of the masking blade means 10 and the average transmissivity $R_r$ of the reticle 12 are inputted into the computing means 19 in the exposure operation (or these data may be read automatically), on the basis of which the exposure correction value $\phi$ changeable momentarily is calculated and, by using the exposure correction value $\phi$ and the light quantity (illuminance) as detected through the integrated light quantity detector, the exposure amount is controlled correctly.

Then, the exposure operation is stopped at time $t=t_1$ and it is restarted at time $t=t_2$. The exposure correction value $\phi_1$ at time $t=t_1$ is calculated in accordance with $\phi_1 = f_2(t_1-t_0, I_1, S_m, R_r, \phi_0)$ while the exposure correction value $\phi_2$ at time $t=t_2$ is calculated in accordance with $\phi_2 = f_3(t_2-t_1, \phi_1)$. After a start of the exposure operation, the exposure correction value $\phi_J$ at time $t=t_J$ can be calculated in accordance with $\phi_J = f_2(t_J-t_2, I_1, S_m, R_r, \phi_2)$ In this manner, the just preceding exposure correction value and the time elapsed (exposure period time and non-exposure period time) are memorized, on the basis of which the current exposure correction value can be calculated constantly. It is to be noted that the functions $f_2$ and $f_3$ are determined beforehand through experiments.

The functions $f_2$ and $f_3$ are expressed by equations (3) and (4) as follows:

$$\phi_1 = f_2(t_1 - t_0, I, S_m, R_r, \phi_0) \quad (3)$$
$$= \phi_m - (\phi_m - \phi_0)_e - [(t_1 - t_0) \times I_1 \times S_m \times R_r]/K_1$$

$$\phi_2 = f_3(t_2 - t_1, \phi_1) \quad (4)$$
$$= 1 - (1 - \phi_1)_e - (t_2 - t_1)/K_2$$

Equation (3) represents the exposure correction value, which is at $\phi$ at the time of a start of the exposure process, and changes close to $\phi_m$ with an advancement of the exposure process. On the other hand, equation (4) represents the exposure correction value, which is at $\phi_1$ at the time of completion of the exposure process, and becomes close to unity with a lapse of time.

Constants $\phi_m$, $K_1$ and $K_2$ in equations (3) and (4) can be determined as follows:

In the apparatus of FIG. 1, the size of the aperture of the masking blade 10 is set at a certain reference value (e.g., $S_m=10$ cm$^2$), and the reticle 12 is moved out of the path of the illumination light by which $R_r=1$ (100%) is set. Also, the detector 17 is moved to and placed at a position within the region to be illuminated with the illumination light, just below the optical system 13. Thereafter, changes of exposure correction value in the exposure process are measured. At time $t-t_0$, the shutter 4 is opened. While keeping this shutter 4 opened, outputs (illuminances) of the detectors 9 and 17 are detected once per one minute, for example, and the exposure correction value $\phi(=I_2/I_1)$ is determined. The thus obtained results are plotted in a graph and, by means of the least square method, the constants $\phi_m$ and $K_1$ in equation (3) are determined. Most preferably, the measurement of an exposure correction value may be made until $\phi-\phi_0$ is reached. Subsequently, the shutter 4 is closed, and changes of exposure correction value in the non-exposure period are measured. The measurement in this period may be done in the same manner and under the same conditions as those of the measurement during the exposure process period, and the exposure correction value $\phi(=I_2/I_1)$ is detected. The results are plotted in a graph and, by means of the least square method, the constant $K_2$ in equation (4) is determined. It is to be noted that, at the time of detection of the outputs (illuminances) $I_1$ and $I_2$ of the detectors 9 and 17, which may be done once per one minute, for example, the shutter 4 should be opened for a time period sufficiently short so as not to degrade the reliability of the measurement result.

In this embodiment, the values of the constants $t_1$, $t_2$ and $I_1$ as detected through the detector 9 and a timer (not shown) are substituted into equations (3) and (4) and, on the basis of this, changes in exposure correction value $\phi$ during the exposure operation are calculated successively and, for each shot of the wafer, the exposure control is made. However, the exposure time for one shot is very short and the exposure correction value does not substantially change during such a short period. Therefore, calculation of the exposure correction value $\phi$ and exposure control based on this may be done for every one of plural shots or for every one wafer having plural shots.

FIG. 3 corresponds to a case where each exposure correction value $\phi$ is calculated for every one of the plural shots and, based on this, exposure control is done. The exposure of a first shot is made during time $t_0$ to $t_1$, the exposure of a second shot is made during time $t_2$ to $t_3$ and the exposure of a third shot is made during time $t_4$ to $t_5$. Changes in exposure correction value during these time periods are depicted by broken lines.

In this example, as an inherent exposure correction value peculiar to each shot, an exposure correction value $\phi_0$ is used for the first shot, an exposure correction value $\phi_2$ is used for the second shot, and an exposure correction value $\phi_4$ is used for the third shot. These exposure correction values ($\phi_1$, $\phi_2$, $\phi_3$, ...) may be calculated in the same manner as in the first embodiment.

FIG. 4 corresponds to a case where, for each wafer, one exposure correction value is calculated and, based on this, the exposure control is done. During time $t_0$ to $t_1$, the exposure of a first wafer is made. From time $t_2$, the exposure of a second wafer starts. The exposure process of each wafer comprises exposures of a number of shots.

In this example, an inherent or predetermined exposure correction value is used in the exposure process of each wafer. On this occasion, the exposure process of one wafer comprises repetitions of exposure periods and non-exposure periods. A momentarily changeable exposure correction value may be calculated successively to determine the exposure correction value $\phi_1$ Alternatively, since each non-exposure period is very short, the exposures to be made to one wafer may be considered to be a single exposure process and the exposure correction value $\phi_1$ may be determined on the basis of an average received light quantity.

When the transmissivity changes with a change in environmental conditions, a sensor (not shown) may desirably be used to monitor such a change in environment so that the exposure correction may be done on the basis of calculation and the result of monitoring.

Figure 5:
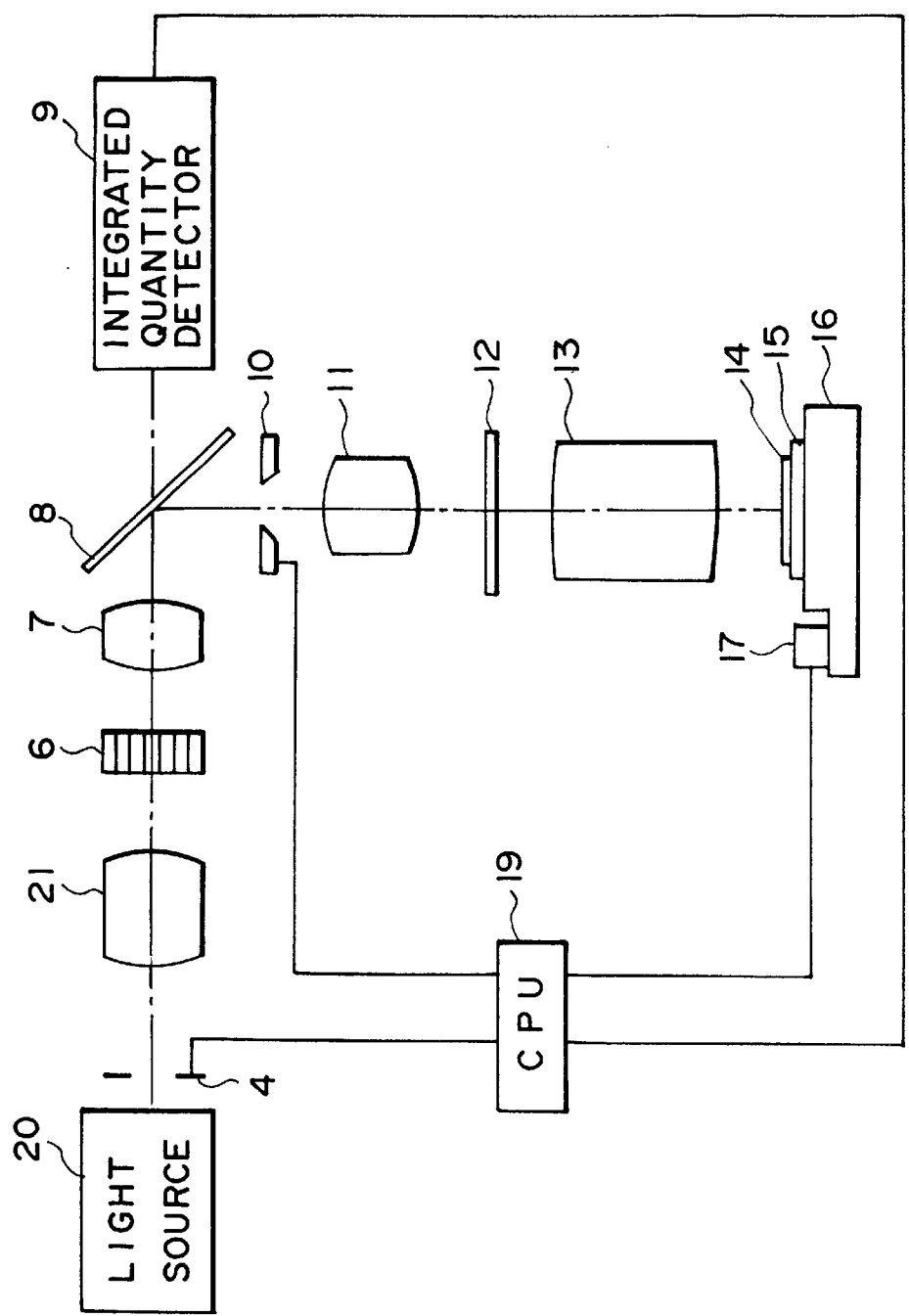
FIG. 5 is a schematic view of a second embodiment of the present invention.

FIG. 5 is a schematic view of a second embodiment of the present invention.

In this embodiment, a pulse emission type light source 20 such as a KrF excimer laser, for example, is used. The remaining structure of this embodiment is essentially the same as that of the first embodiment.

In this embodiment, the exposure process of one shot comprises repetitions of exposure periods and non-exposure periods. Thus, an average received light quantity is used.

In the above-described embodiments, the exposure correction value is calculated on the basis of exposure hysteresis. However, each exposure correction value $\phi(=I_1/I_2)$ may be calculated directly for every shot, for every wafer or for every wafer lot, by using the exposure amount detector 17 and the integrated light quantity detector 9.

Also, calibration of $\phi$ may be done by using the detectors 17 and 19 at regular intervals, so as to correct any error between the calculated value of the exposure correction value and the actual value during the operation.

While the invention has been described with reference to the structures disclosed herein, it is not confined to the details set forth and this application is intended to cover such modifications or changes as may come within the purposes of the improvements or the scope of the following claims.

What is claimed is:

1. An exposure apparatus for transferring a pattern onto a substrate, said apparatus comprising:

a detecting device for detecting a light quantity upon the substrate, on the basis of a portion of exposure light divided by a beam splitter;

a memory for memorizing information related to a variation, with respect to an exposrue history, in light transmission efficiency of an optical system disposed between a position of the substrate and a position where the portion of the exposure light is extracted; and a controller for determining a correction value for correcting a detection result of said detecting device, on the basis of the exposure history and the information memorized in said memory, said controller controlling an exposure amount for the substrate by use of the correction value and the detection result.

2. An apparatus according to claim 1, wherein the substrate comprises a wafer having a number of shot areas thereon and wherein the correction value is calculated in response to completion of the exposure of each shot of the wafer.

3. An appratus according to claim 1, wherein the substrate comprises a wafer having a number of shot areas thereon and wherein the correction value is calculated in response to completion of exposures of a predetermined number of shots of the wafer.

4. An apparatus according to claim 1, wherein the substrate comprises a wafer having a number of shot areas thereon and wherein the correction value is calculated in response to completion of exposures of each wafer.

5. An apparatus according to claim 1, wherein the substrate comprises a wafer having a number of shot areas thereon and wherein the correction value is calculated in response to completion of exposures of a predetermined number of wafers.

6. An apparatus according to claim 1, wherein the exposure history concerns an exposure light supplying time.

7. An apparatus according to claim 6, wherein the exposure light is excimer laser light.

8. An apparatus according to claim 1, wherein the exposure history concerns a time elapsed after the supply of the exposure light is interrupted.

9. An apparatus according to claim 8, wherein the exposure light is excimer laser light.

10. An apparatus according to claim 1, wherein the exposure light is excimer laser light.

11. A semiconductor device manufacturing method, comprising the steps of:

providing a mask and a substrate; and exposing the substrate to a device pattern of the mark by use of an exposure apparatus as recited in claim 1.

12. An exposure apparatus for transferring a pattern onto a substrate, said apparatus comprising:

a detecting device for detecting a light quantity upon the substrate, on the basis of a portion of exposure light divided by a beam splitter;

a memory for memorizing information related to a variation, with respect to a change in environment, in light transmission efficiency of an optical system disposed between a position of the substrate and a position where the portion of the exposure light is extracted; and a controller for determining a correction value for correcting a detection result of said detecting device, on the basis of a current environment and the information memorized in said memory, said controller controlling an exposure amount for the substrate by use of the correction value and the detection result.

13. An apparatus according to claim 12, wherein the change of environment concerns a change in humidity.

14. An apparatus according to claim 13, wherein the exposure light is excimer laser light.

15. An apparatus according to claim 12, wherein the change in environment concerns a change in temperature.

16. An apparatus according to claim 15, wherein the exposure light is excimer laser light.

17. An apparatus according to claim 12, wherein the exposure light is excimer laser light.

18. A semiconductor device manufacturing method, comprising the steps:

providing a mask and a substrate; and exposing the substrate to a device pattern of the mask by use of an exposure apparatus as recited in claim 12.

* * * * *

UNITED STATES PATENT AND TRADEMARK OFFICE
CERTIFICATE OF CORRECTION

PATENT NO.  : 6,757,050 B1
DATED       : June 29, 2004
INVENTOR(S) : Takahisa Shiozawa It is certified that error appears in the above-identified patent and that said Letters Patent is hereby corrected as shown below:

<u>Title page</u>,
Item [56], References Cited, U.S. PATENT DOCUMENTS, the seventh-listed document "4,998,212 A * 3/1991 Ohta et al............353/122" should read -- 4,998,821 A * 3/1991 Ohta et al ...........353/122 --.

<u>Column 7</u>,
Line 26, "exposrue" should read -- exposure --.
Line 41, "appratus" should read -- apparatus --.

<u>Column 8</u>,
Line 17, "mark" should read -- mask --.
Line 47, "steps:" should read -- steps of: --.

Signed and Sealed this

Fifth Day of October, 2004

JON W. DUDAS
*Director of the United States Patent and Trademark Office*